Sept. 14, 1954  H. F. HEISLER  2,688,856
COUPLING
Filed June 3, 1950
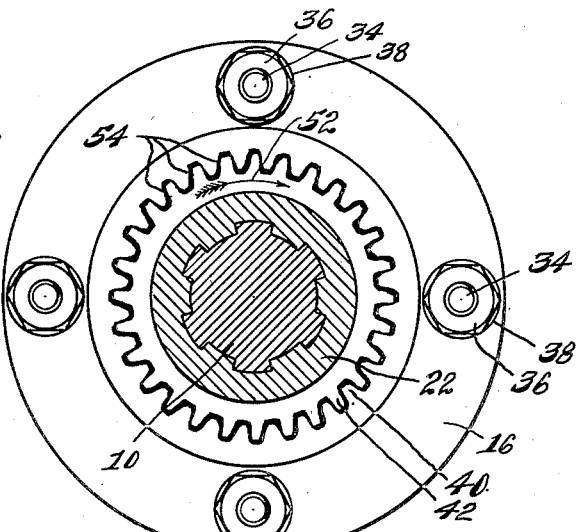
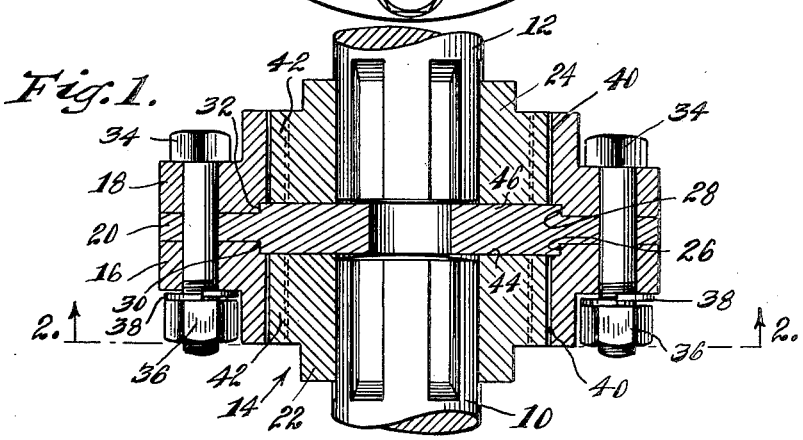
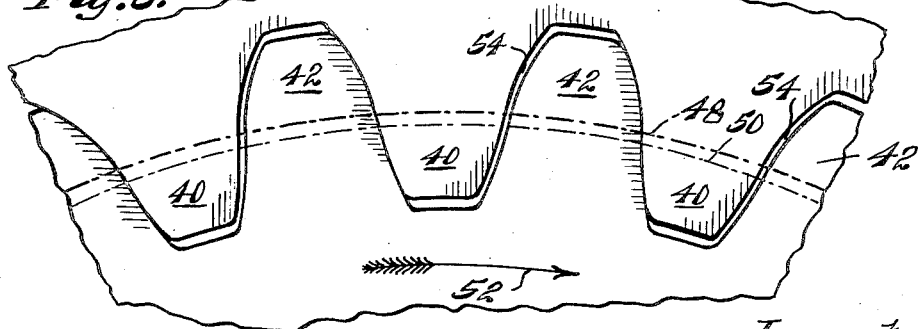
Inventor.
Harry F. Heisler.
By Bair, Freeman & Molinare
Attys.

Patented Sept. 14, 1954

2,688,856

UNITED STATES PATENT OFFICE 2,688,856

COUPLING

Harry F. Heisler, Hudson, Iowa

Application June 3, 1950, Serial No. 165,900

1 Claim. (Cl. 64—9)

This invention relates to couplings and more particularly to a shaft coupling for angularly or parallely misaligned shafts.

It is often very difficult to get perfect alignment between the ends of shafts which are to be coupled together. Thus, numerous flexible couplings have been devised to couple angularly and parallelly misaligned shafts. For example there are universal joint type couplings; couplings consisting of flanges joined together by a flexible material such as rubber; and couplings having hub members thereof movable with respect to each other in grooves or slots in the flange members of the coupling, whereby the misalignment is provided for.

In the transmission of continuous heavy loads, or in the transmission of continually sharply fluctuating loads, it is found that ordinary couplings of the type described above either are not strong enough, or wear out very rapidly. Although couplings of the types described above could be designed large enough for the load transmitted, it is found that for large loads which approach the design limits of the transmission shafts, the couplings must be very large, bulky, and uneconomical. Furthermore, the flexible material used in these flexible couplings is often subject to deteriorating wear from oil, fumes, or industrial liquids which are often present in industrial plants where such couplings are to be used.

Thus, one of the objects of this invention is to provide a novel and improved shaft coupling for angularly or parallelly misaligned shafts, which shaft coupling is particularly characterized by its ability to withstand wear.

Another object of this invention is to provide a coupling for misaligned shafts which coupling will transmit continuous heavy loads or sharply fluctuating loads with very little wear in said coupling.

A further object of this invention is to provide a coupling for misaligned shafts, which coupling will transmit continuous heavy loads and sharply fluctuating loads and which coupling is not larger, bulky or more expensive than ordinary couplings for aligned shafts.

A still further object of this invention is to provide a coupling for misaligned shaft, which coupling is characterized by its simplicity of structure and by its simplicity of manufacture.

Further objects and advantages of this invention will become apparent as the following description proceeds and the features of novelty which characterize this invention will be pointed out with particularity in the claim annexed to and forming part of this specification.

A preferred embodiment of the invention is shown in the accompanying drawing, in which—

Figure 1 is a cross sectional view of my coupling mounted between the ends of two misaligned shafts;

Figure 2 is a cross sectional view of my coupling and is taken on line 2—2 of Figure 1; and Figure 3 is an enlarged view of the toothed connection between the collar and the flange of the coupling.

Referring to Figure 1 there is shown a pair of shafts 10 and 12 which may be angularly or parallelly misaligned. A coupling, generally indicated at 14, joins the ends of shafts 10 and 12 together. The coupling 14 comprises a pair of annular coupling flanges 16 and 18, a center disc 20, and a pair of hubs 22 and 24.

The center disc 20 is provided with circular shoulders 26 and 28. These shoulders 26 and 28 cooperate respectively with recesses 30 and 32 in annular flanges 16 and 18 to position said annular flanges with respect to each other. The annular flanges 16 and 18 and the center disc 20 are rigidly bolted together by means of bolts 34, nuts 36 and lock washers 38.

The inner edge of annular flanges 16 and 18 have formed therein gear teeth 40. Hubs 22 and 24 are non-rotatably secured to the ends of shafts 10 and 12 by any suitable means, preferably by splining as shown. The outer edge of hubs 22 and 24 have gear teeth 42 formed therein and adapted to mesh with gear teeth 40 on the inner edge of flanges 16 and 18.

The center disc 20 has bosses 44 and 46 adapted to have an end face of hubs 22 and 24 butt against them so as to restrain hubs 22 and 24 against any axial motion in that direction. Bosses 44 and 46 on center disc 20 also serve to space apart the ends of hubs 22 and 24.

The gear teeth 40 on flanges 16 and 18 are broached to the correct size. To provide for misalignment the gear teeth 42 on the hubs 22 and 24 are hobbed to various fits, such as tight, medium, or loose fit. To vary the fit of the hub teeth 42 with the flange teeth 40, it is only necessary to reduce the pitch diameter of the hub teeth 42.

If the gear teeth 40 and 42 are cut to the same pitch diameter there will be no play between the members and hence misalignment between the shafts cannot be provided for. As the pitch diameter of the hub teeth 42 is reduced, the play or backlash between the teeth 40 and 42 is increased, and greater misalignment between the shafts is provided for. To better resist wear, the flanges 16 and 18, the center disc 20, and the hubs 22 and 24 are all made file hard, with an index number of 60 on the Rockwell hardness testing machine.

As shown in Figure 3, the pitch circle of the flange teeth 40 is indicated by the dot and dash arc 48. The pitch circle of the hub teeth 42 is indicated by the dot and dash arc 50. The direction of rotation of the hub is indicated by the arrow 52. The backlash of the gears 40 and 42 is indicated at 54.

While in Figure 1 of the drawings, the hubs or collars 22 and 24 are shown abutting center disc 20, and in this position only parallel misalignment between shafts 10 and 12 may be provided for, it will be evident that when either or both of said hubs 22 and 24 are not in engagement with center disc 20, that angular misalignment between shafts 10 and 12 may also be provided for. It will further be evident that the particular arrangement shown permits axial displacement of either or both of said hubs 22 and 24 along the length of gear teeth 40 on the inner edge of flanges 16 and 18. This is possible because all portions of a hub, or collar, 22 or 24 meshing with a flange 16 or 18, are located within the axially projected confines of the teeth 42 thereon, and all portions of the flanges 16 and 18 are located outwardly of the axially projected confines of the teeth 40 thereon.

It can be seen from the description above that I have provided an improved shaft coupling for angularly or parallelly misaligned shafts carrying continuous heavy loads or sharply fluctuating loads, which coupling is characterized by its ability to withstand wear, by its simplicity of structure, and by its simplicity of manufacture.

While there has been shown and described a particular embodiment of this invention, it will be obvious to those skilled in the art that various changes and modifications may be made therein without departing from the invention and, therefore, it is intended in the appended claim to cover all such changes and modifications as fall within the true spirit and scope of the invention.

What I claim as new and desire to secure by Letters Patent of the United States is:

A coupling for shafts comprising an elongated collar mounted on each shaft and having an elongated gear formed in its outermost cylindrical surface, a pair of annular flanges having elongated gears formed in their innermost cylindrical surface, the gears on the flanges meshing with the gears on the collars, a disc between the pair of annular flanges, means clamping the annular flanges and disc together, means including shoulders on the disc cooperating with recesses in the annular flanges for aligning the flanges on the disc, the central portion of said disc having cylindrical bosses thereon against which said collars are adapted to abut, the surfaces of said bosses being flat and parallel to each other, and the diameter of said bosses being greater than the diameter of said collars, thereby aiding in the aligning of the shafts when the collars on said shafts butt thereagainst, the pitch circle of the gear on each flange being larger than the pitch circle of the meshing gear on the corresponding collar, all portions of each collar being located within the axially projected confines of its gear thereon which meshes with the gear on the corresponding annular flange, and all portions of each annular flange being located outwardly of the axially projected confines of its gear thereon which meshes with the gear on the corresponding collar, whereby unobstructed axial movement is afforded each collar from adjacent the disc outward along the entire axial length of the corresponding flange gear.

References Cited in the file of this patent

UNITED STATES PATENTS

| Number | Name | Date |
|---|---|---|
| Re. 21,843 | Smith et al. | June 24, 1941 |
| 1,641,668 | Fast | Sept. 6, 1927 |
| 2,467,902 | McPhee | Apr. 19, 1949 |
| 2,496,702 | Dykman et al. | Feb. 7, 1950 |